United States Patent
Kelton et al.

[11] Patent Number: 6,031,865
[45] Date of Patent: Feb. 29, 2000

[54] RAPIDLY DECORRELATING SPREADING SEQUENCES FOR DS-CDMA TRANSCEIVERS

[75] Inventors: James Robert Kelton, Oak Park, Ill.; Nicholas William Whinnett, Paris, France; Colin D. Frank, Chicago, Ill.

[73] Assignee: Motorola, Inc., Schaumburg, Ill.

[21] Appl. No.: 08/905,376

[22] Filed: Aug. 4, 1997

[51] Int. Cl.[7] .............................. H04B 15/00; H04K 1/00; H04L 27/30
[52] U.S. Cl. ...................... 375/206; 375/200; 375/201; 370/209; 370/335; 370/342; 370/479
[58] Field of Search ..................... 375/206, 200, 375/201; 370/335, 209, 342, 479

[56] References Cited

U.S. PATENT DOCUMENTS

| | | | |
|---|---|---|---|
| 4,652,838 | 3/1987 | Nossen | 380/6 |
| 4,841,552 | 6/1989 | Kingston | 377/43 |
| 5,309,474 | 5/1994 | Gilhousen et al. | 370/209 |
| 5,544,167 | 8/1996 | Lucas et al. | 370/342 |
| 5,548,613 | 8/1996 | Kaku et al. | 375/208 |
| 5,559,828 | 9/1996 | Armstrong et al. | 375/200 |
| 5,581,575 | 12/1996 | Zehavi et al. | 375/200 |
| 5,619,524 | 4/1997 | Ling et al. | 375/200 |
| 5,623,485 | 4/1997 | Bi | 370/209 |
| 5,648,982 | 7/1997 | Durrant et al. | 375/206 |
| 5,659,573 | 8/1997 | Bruckert et al. | 375/200 |
| 5,734,647 | 3/1998 | Yoshida et al. | 370/335 |
| 5,751,705 | 5/1998 | Sato | 370/335 |
| 5,793,798 | 8/1998 | Rudish e al. | 375/206 |
| 5,818,867 | 10/1998 | Rasmussen et al. | 375/200 |

*Primary Examiner*—Stephen Chin
*Assistant Examiner*—Michael W. Maddox
*Attorney, Agent, or Firm*—Kenneth A. Haas

[57] ABSTRACT

A transmitter for a communication system transmits consecutive chips of a signal shifted in phase +/−90 degrees +/− nan angle between 0 degrees and 45 degrees which is a function of a spreading gain.

12 Claims, 3 Drawing Sheets

— PRIOR ART —

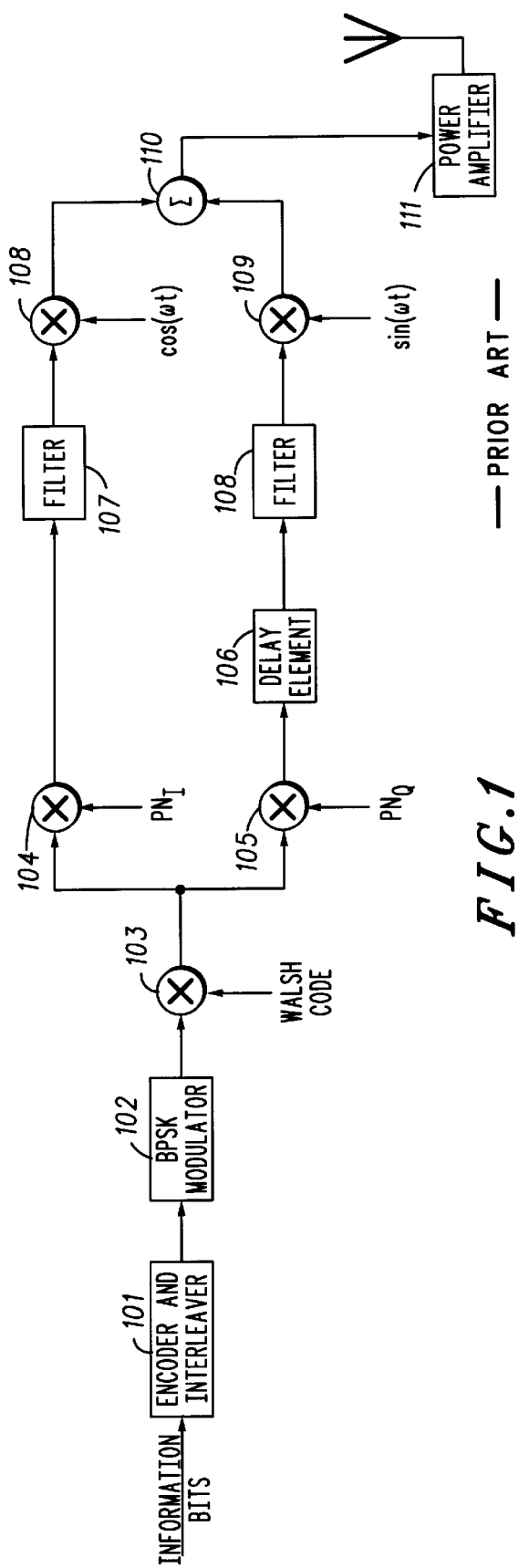
*FIG.1* — PRIOR ART —
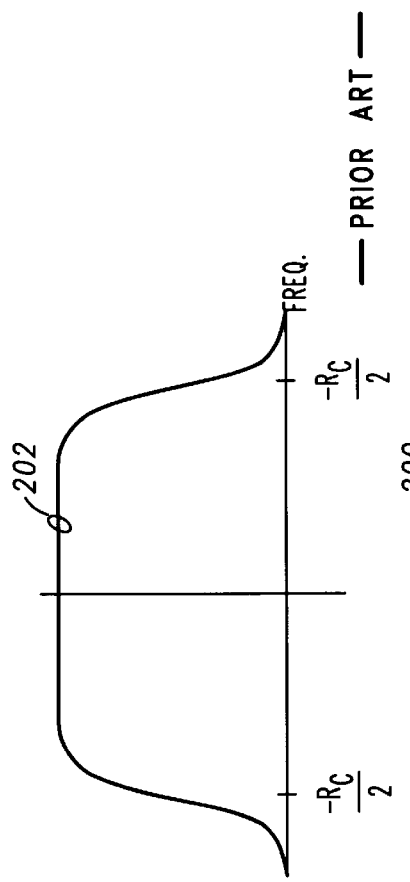
*FIG.2* — PRIOR ART —

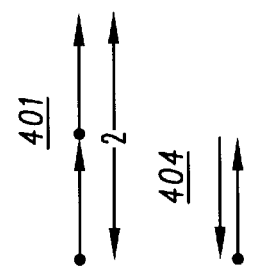
FIG.3 — PRIOR ART —
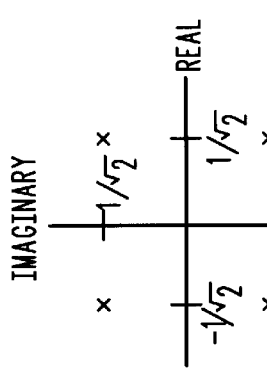
FIG.4
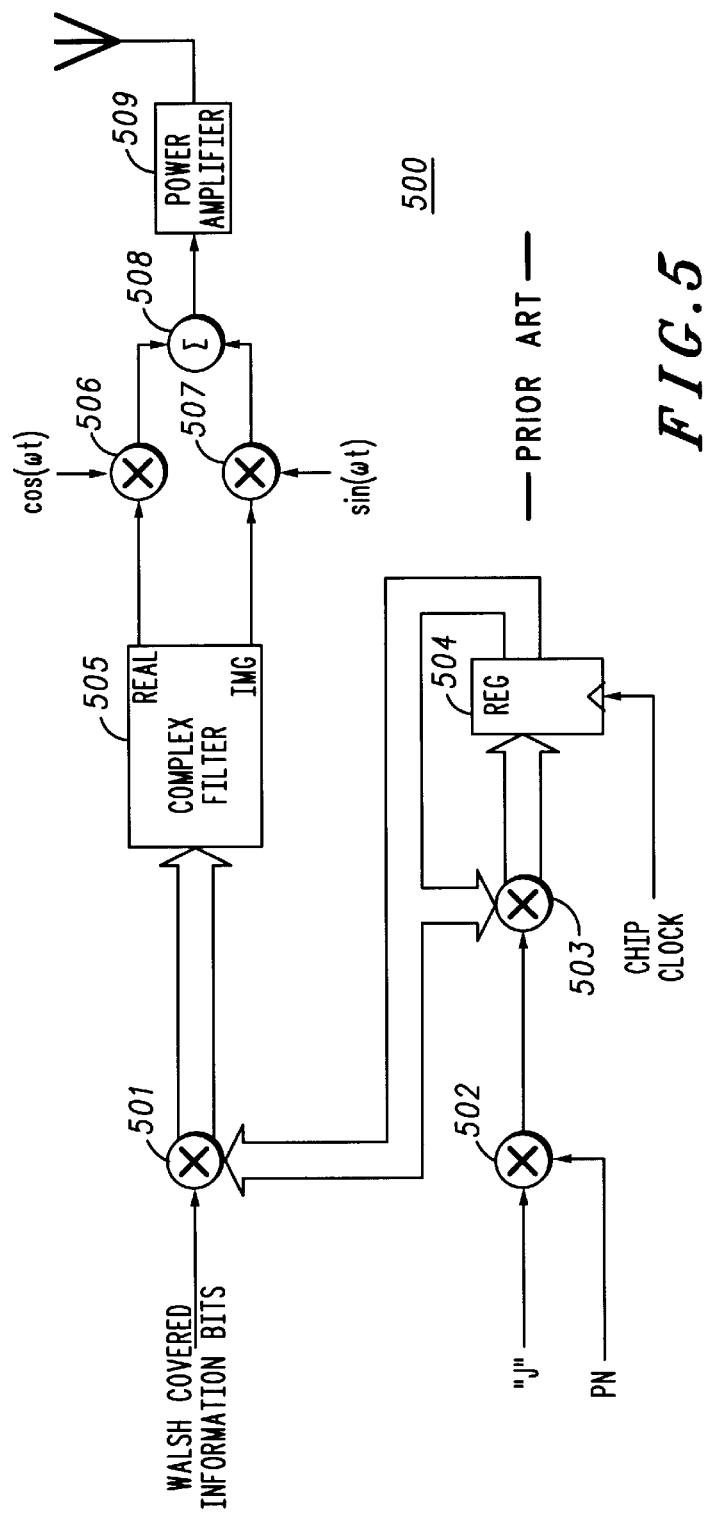
FIG.5 — PRIOR ART —

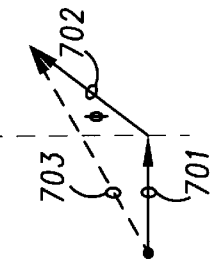
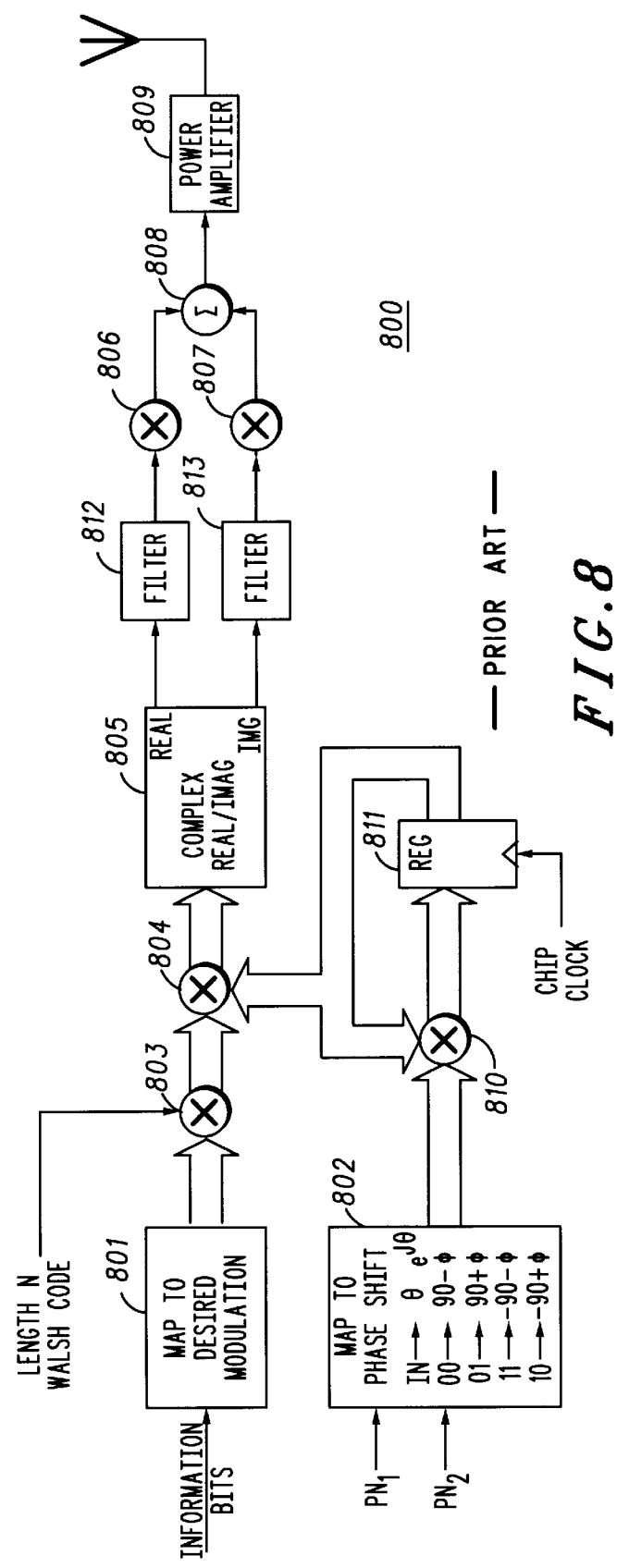
FIG.6
FIG.7
FIG.8 — PRIOR ART —

RAPIDLY DECORRELATING SPREADING SEQUENCES FOR DS-CDMA TRANSCEIVERS

FIELD OF THE INVENTION

The present invention relates generally to code division multiple access (CDMA) systems, and more particularly to a modulation scheme for gain spreading in a direct sequence CDMA (DS-CDMA) system.

BACKGROUND OF THE INVENTION

DS-CDMA or CDMA communication systems are being implemented as cellular telephone systems. A CDMA system includes a system controller and at least one base station. Each base station provides communication service to a fixed geographic area or cell. Mobile stations in a cell communicate with the base station for that cell. Communication with a mobile station is handed off among base stations as the mobile station moves among cells. One example of such a system is a system according to a EIA/TIA interim standard 95 Mobile Station-Base Station Compatibility Standard for Dual-Mode Wideband Spread Spectrum Cellular System ("IS-95").

A typical DS-CDMA transmitter 100 is shown in FIG. 1. The transmitter accepts information bits. These may be digitized, compressed voice or digital data formatted in an appropriate protocol. These bits are encoded for error correction and interleaved in encoder and interleaver 101. The resulting binary data stream is mapped from binary data (0,1) to symbols (−1,+1) in the binary-to-numeric block 102. Each symbol of the emerging data stream is multiplied by a length N Walsh code, where N is normally an integer power of 2, by multiplier 103, in a process referred to as Walsh covering. The duration of each element of the Walsh code is referred to as the chip duration and the inverse of this quantity is the chip rate. Because all length N Walsh codes are orthogonal to each other, this will allow the receiver to separate individual uses by correlation to a received signal with the given Walsh code. The sequence formed by the Walsh covering is then multiplied by a complex spreading sequence. This is accomplished by performing two real multiplies, one in which the Walsh covered sequence is multiplied by a first psuedorandom noise sequence PNi by multiplier 104 to form the in-phase channel and the other by a second sequence PNq in multiplier 105 to form the quadrature component of the complex baseband signal. Note that the spreading sequence formed by PNi and occupy a quartenary phase shift keyed (QPSK) constellation, and therefore will be referred to as a QPSK modulation or a QPSK spreading sequence. In general, a spreading sequence will be considered any sequence with relatively uniform spectrum over a desired range which is multiplied by a second sequence for the purpose uniformly distributing a signal across the extent of the desired band. For systems such as IS-95, in which offset quartenary phase shift keying is specified for subscriber unit transmission, the quadrature component of the complex baseband signal is delayed by ½ chip by delay element 106. Both the delayed quadrature and the in-phase component of the signal are then filtered by identical spectral shaping filters 107 and 108 to prevent out-of-band emissions. The filtered in-phase component is then multiplied by $\cos(\omega t)$ in multiplier 113 and the filtered quadrature component by $\sin(\omega t)$ in multiplier 109 and the resulting signals summed in summer 110 to up-convert the baseband signal to the desired carrier frequency. The modulated carrier produced by summer 110 is then amplified by power amplifier 111 to the desired power level.

When the in-phase and quadrature signals are scaled in filters 107 and 108, the peak magnitude of the output of the in-phase and/or quadrature signals will exceed the average output magnitude. The ratio of the peak magnitude of the filter output to the average level is referred to as peak-to-average ratio. High peak-to-average ratios are undesirable because the power amplifier 111 must be linear over the entire signal range, including the peak value. Therefore the peak signal level determines both the size and bias requirements of the power amplifier. High peak-to-average ratios therefore imply higher current drain, large size, and more costly power amplifiers. These characteristics become very important in low cost, battery powered subscriber units.

Attempts have been made to reduce the peak-to-average ratio to eliminate the necessity of increasing the capacity of the power amplifier. Focus has been placed mainly upon the signal spreading scheme since certain schemes have been found to directly reduce the peak-to-average ratio. These sequences must be chosen in a mariner which not only reduces the peak-to-average ratio but also has a short duration auto-correlation to preserve the interference averaging properties of QPSK spreading.

Accordingly, a need exists for a modulation scheme which minimizes linearity requirements in single code scenarios.

BRIEF DESCRIPTION OF THE DRAWINGS

FIG. 1 is an overview of a DS-CDMA transmitter.

FIG. 2 is a typical impulse response and frequency response of the spectral shaping filters employed in a DS-CDMA system.

FIG. 3 is the constellation of a QPSK spreading sequence.

FIG. 4 is a representation of the vector addition of two vectors each with 4 possible values.

FIG. 5 is a block diagram of a $\pi/2$-BPSK modulator.

FIG. 6 is a representation of the possible phase shifts of the proposed spreading sequence.

FIG. 7 shows the vector addition of the chip components in a two chip duration filter system under the proposed invention.

FIG. 8 is a block diagram of the proposed spreading sequence.

DETAILED DESCRIPTION OF A PREFERRED EMBODIMENT

The present invention provides a spreading sequence for a communication system which is preferably a DS-CDMA system. Consecutive chips of signals transmitted in the communication system are shifted in phase for spread spectrum modulation. The phase shift is plus or minus (+/−) 90 degrees plus or minus an angle phi having a value between 0 degrees and 45 degrees.

In the preferred embodiment of the present invention, phi is a function of the spreading function and is preferably pi/6. The modulation scheme is a QPSK modulation and the angle phi, in a second embodiment, is randomly selected. The spreading sequence is preferably included in a transmitter in the telecommunication system.

The peak signal level of a DS-CDMA transmitter can be determined by examination of the peak level of the complex output filters 107 and 108 in FIG. 1, in which the in-phase filter 107 output forms the real part and the quadrature filter 108 output is forms the imaginary part of the complex signal. Under this assumption and the further assumption that filters 107 and 108 have identical impulse responses, this complex output signal is the convolution of the complex input signal, formed in a like manner to the output signal except for the use of the signals at the input to the filter, and the filter impulse response. A typical impulse response of these filters is shown in FIG. 2. While this is a typical impulse response and not directly used by any known system, several properties of impulse response 201 are common to most DS-CDMA systems which attempt to minimize the bandwidth occupied by the transmitted signal. First, the vast majority of the energy of the filter is contained in the interval +/−Tc, and second the first zero crossings of the filter impulse response 201 occur near the points +/−Tc. The second condition follows because the minimum bandwidth which can be occupied by a DS-CDMA system is given by the chip rate, Rc. A typical frequency response 202 is shown in FIG. 2. Given these two properties, much insight into the techniques affecting the peak signal level of the output complex signals can be investigated by assuming the impulse response of filters 107 and 108 are zero outside of the interval +/−Tc.

For the DS-CDMA system shown in FIG. 1, the input complex signals are constant over a chip duration Tc. Further, this signal can take on the values sqrt(½)*(+/−1+/−j)

where j is the square root of −1 and the term sqrt(½) is included to normalize the magnitude of each chip. This is shown graphically in the QPSK constellation shown in FIG. 3. Therefore, with the assumption that impulse response 201 is zero outside of the region +/−Tc, the output complex signal consists of two components, one due to the present chip input and the one due to the previous chip input. The magnitude of the output complex signal will be maximized when these two complex components add with the same phase. In this case the magnitude of the resultant will be twice the magnitude of signal due to each component. For this case the components due to each of the two chips will have equal magnitude and have either the same phase angle or differ in phase by 90, 180, or 270 degrees. Assume that the filter gain is such that the magnitude of these chip components is normalized. This vector addition of the complex valued components is shown in FIG. 4 (400). In 401, the components are shown adding in phase yielding a magnitude of 2, in 402 and 403, the components are +/−90 degrees out of phase yielding a magnitude sqrt(2), and in 404 the components are 180 degrees out of phase yielding zero magnitude. By simply enumerating these for cases, it can be shown that the magnitude of the output complex signal will either be 0, sqrt(2), or 2. Because the sqrt(2) term appears for two phase differences and all phase differences are equally probable, the average power level in the output complex signal is twice the average power level of each chip component and the peak power level is 4 times the power in each chip component. Therefore the peak-to-average ratio is 2 or 3 dB.

In the previous situation, the peak signal level occurs when two consecutive chips possess the same value. If this situation is not allowed, the peak-to-average ratio can be reduced. One modulation method which accomplishes this is referred to as π/2 shifted binary phase shift keying (π/2-BPSK). With π/2-BPSK, the phase of the next chip is determined by changing the phase of the present chip by +/−90 degrees, with the phase selected randomly as shown in FIG. 5 (500). The Π/2-BPSK system shown in FIG. 5 generates the Walsh covered information identically to the system in FIG. 1. The spreading sequence is now generated by multiplying j by a PN sequence generated by pseudo-randomly selecting +/−1 in multiplier 502 and multiplying this value by the present value of the chip sequence stored in register 504 in multiplier 503. Register 403 is clocked at the chip rate. This generates a sequence in which consecutive chips are either +/−90 degrees out of phase with each other. As further shown in FIG. 5, the output of register 504 is multiplied with Walsh covered information bits via multiplier 501, which outputs an input into a complex filter 505. The complex filter outputs a real value which is multiplied with cos(ωt) via multiplier 506 and also an imaginary value which is multiplied with sin(ωt) via multiplier 507. The outputs of multipliers 506 and 507 are summed in a summer 508, whose output is then amplified by a power amplifier 509.

For the simple length 2*Tc filter used above, the π/2-BPSK spreading sequence will produce output complex chip components which are always either +/−90 degrees out of phase with each other. Therefore, the output complex signal have a constant amplitude sqrt(2) times larger than the value of each chip component. The peak-to-average ratio is therefore 1 or 0 dB, a 3 dB improvement over QPSK. For more realistic filters, the improvement is not as great but still substantial. For a square root raised cosine filter with an excess bandwidth factor of 0.2, the peak-to-average ratio is less than 4.9 dB and 3.0 dB 99% of the time for QPSK and π2-BPSK respectfully.

While π2-BPSK shows marked improvement in the peak-to-average ratio when compared to QPSK, π2-BPSK shows a carrier phase dependence on the level of interference. In a situation in which one dominate interferer exists, this situation is undesirable as it can lead to long periods of time in which the interference is higher than the average value by as much as 3 dB. For high speed data transmission, in which one subscriber unit may transmit with very high power levels, it is likely that a dominant interferer will often exist.

To understand the dependence of interference levels on the relative phase of the desired and interfering signal, consider the case in which two signals, a desired and an interfering, are received coherently at the same base with equal energy. Because of differences in the path length from the transmitters to the receiver, these two will differ in carrier phase by an angle σ. If these two signals are received with the same phase or antiphased, σ=0 or 180 degrees, the two signals will posses the same energy after coherent detection of the desired signal. If they are received with σ=+/−90 degrees, none of the interfering will remain after coherent detection of the desired signal. In general, it is well known the coherent detection will cause the interference signal to vary as the cos(σ).

Now add modulation to above discussion of the carrier phase. If the desired and interfering signal are in phase during chip period N, the desired and interfering signals will either be in phase or antiphase during chip period N+1 if π2-BPSK modulation is employed. This is because both the desired and interfering signals will have changed phase by +/−90 degrees, causing the relative phase of the two to change by 0 or 180 degrees. Therefore, if the interference is at a maximum due to carrier phase at chip N, it will be at a maximum during chip N+1. By induction, the interference level will always be at a maximum. Note that in practice this situation will not persist indefinitely due to motion of the mobile units and drifting of reference oscillators. However, these changes are slow and the interference can remain strong for considerable periods.

For QPSK modulation if carrier phase alignment exists at chip N, the relative phase the desired and interfering signals will differ by 0, 90, 180, or 270 degrees at chip N+1. The interference energy is equally likely to be either 1 or 0, and will on average be 0.5. Therefore, the phase alignment on a given chip implies that the average value of interference will be seen on subsequent chips. Because the relative phase angles of the desired and interfering signals are a function of path length and therefore random, to see the average value of interference regardless of relative carrier phase angle is the most desirable result possible.

The proposed invention teaches a spreading modulation which restricts the phase transitions of the input complex signal to +/−(90+α$\Phi$) degrees, where α is a binary (+/−1) code operating at the chip rate and $\Phi$ is a fixed phase term having a value between 0 and 45 degrees. These transitions are shown in FIG. 6 (600). The spreading modulation is applied to the data bits after Walsh covering. One method to generate this modulation is shown in FIG. 7 (700).

The proposed modulation shows good but imperfect phase averaging. If the desired and interfering signal are phase aligned on chip N, at chip N+1 the signals will differ in phase by 2$\Phi$, 180, or 180−2$\Phi$ degrees. In the limiting cases of $\Phi$=0 degrees, the phases differ only slightly from 0 and 180 degrees, and little decorrelation occurs. As $\Phi$ approaches the other limit of 45 degrees, the phase changes approach 0, +/−90, and 180 degrees, each equally likely, and decorrelation occurs in one chip period. Between these limiting cases, decorrelation will not occur instantly. However, because the effects of the misalignment of carrier phase are cumulative, the interference level does decorrelate. The rate of this decorrelation increases with $\Phi$. Note that the period for interference levels to return to average given that phase alignment occurred on chip N is a function of the conditional auto-correlation of the spreading sequence. As the auto-correlation given that phase alignment occurred on chip N becomes shorter, the time for interference levels to return to normal will become shorter as well.

The proposed modulation decreases the peak-to-average ratio by guaranteeing that consecutive chips cannot line up in phase. This modulation does not give orthogonal output chip components as with π/2-BPSK, but can come arbitrarily close with small $\Phi$. Assume that the two chip components 701 and 702 are both unit magnitude. Then the maximum of the resultant will have a magnitude of $$\mathrm{sqrt}(2*(1+\sin(\Phi)))$$

and the minimum will be $$\mathrm{sqrt}((2*(1-\sin(\Phi)))$$

The average energy will be the average of the square of the above two equations, or simply 2. The peak-to-average of the energy is therefore 1+sin($\Phi$) for the simple two chip duration filter. To the data below shows actual peak-to-average ratios and decorrelation periods for a square root raised cosine filter with an excess bandwidth factor of 0.2. The peak-to-average ratio given is the value which is not exceeded 99% of the time. The decorrelation periods are given in chip periods, Tc. This defines the minimum appropriate spreading gain as a sequence which decorrelates in less than a bit time. Decorrelation in less than a bit time is important because sequences which do not decorrelate in less than a bit can have significant variations in interference levels from one bit to the next which results in a higher bit error rate than would be observed in average interference levels are observed over all bits.

| $\Phi$ | Peak to Average Ratio (dB) | Suitable Spreading factors |
|---|---|---|
| π/32 | 3.0 | >=64 |
| 2π/32 | 3.2 | >=16 |
| 3π/32 | 3.4 | >=8 |
| 4π/32 | 3.6 | >=4 |
| π/4 (equivalent to π/4 QPSK) | 4.5 | Any |
| QPSK | 4.9 | Any |
| O-QPSK | 4.2 | Any |

Summarizing, the proposed spreading sequence is for a DS-CDMA radio transmitter. The phase consecutive chips of the transmitted signals are shifted plus or minus 90 degrees plus or minus an angle between 0 degrees and 45 degrees. The spreading is accomplished by multiplying a sequence of modulated information bits by the spreading sequence. The angle of the shift of the spreading sequence may be chosen in response to pairs of bits from pseudorandom number generators as shown in FIG. 8. This angle $\Phi$ may be set to any value. However, $\Phi$ may be varied as a function of spreading gain to allow the minimum peak-to-average ratio to be achieved while still keeping the conditional cross correlation of time shifted versions of this spreading sequences short relative to a bit time. Also note that a value of $\Phi$ of 30 degrees gives a special case in which the constellation contains only 6 possible points, 4 of which will be used at any one time. With reference to FIG. 8, information bits are mapped to the desired modulation in block 801. The output of block 801 are multiplied with length N Walsh codes in multiplier 803, which outputs an input into another multiplier 804. In block 802, $PN_1$ and $PN_2$ are mapped to produce various phase shifts. The output of block 802 is multiplied with the output of a register 811 via multiplier 810 which is clocked with a chip clock. The output of multiplier 810 is also utilized as input to register 811. Continuing, the output of register 811 is used as an input to multiplier 804, whose output is input into a complex filter 805. The complex filter 805 outputs a real value which is filtered by filter 812 and multiplied with cos(ωt) (not shown) via multiplier 806. The complex filter 805 also outputs an imaginary value which is filtered by filter 813 and multiplied with sin(ωt) (not shown) via multiplier 807. The outputs of multipliers 806 and 807 are summed in a summer 808, whose output is then amplified by a power amplifier 809.

What is claimed is:

1. A method of generating a modulated signal using a spreading sequence in a transmitter in a communication system where a phase of consecutive chips of signals to be transmitted, the method comprising the steps of phase shifting an input signal +/−90 degrees and further phase shifting the input signal +/− an angle between 0 degrees and 45 degrees such that the effects of interference between users is improved, wherein the angle is a function of a spreading gain.

2. The method of claim 1 wherein the spreading sequence is generated via a spread spectrum modulation scheme.

3. The method of claim 1 wherein the spreading sequence is generated via a QPSK modulation.

4. The method of claim 1 wherein the communication system is a CDMA system.

5. The method of claim 4 wherein the CDMA system is a DS-CDMA system.

6. The method of claim 1 wherein the angle is randomly selected.

7. A method of spreading signals in a transmitter in a communication system comprising the steps of:

selecting an angle between 0 and 45 degrees as a function of spreading gain;

phase shifting consecutive chips of the signals by +/−90 degrees +/− the angle; and transmitting the signals such that the effects of interference between the transmitted signals is improved.

8. A method according to claim 7 wherein the step of transmitting the signals comprises transmitting the signals in a CDMA system.

9. A transmitter for a communication system comprising a modulator which, when operatively coupled to the telecommunication system, phase shifts consecutive chips of signals +/−90 degrees +/− an angle between 0 and 45 degrees for transmission such that the effects of interference between users is improved, wherein the angle is a function of a spreading gain.

10. A transmitter according to claim 9 wherein the modulator comprises a means for phase shifting the consecutive chips.

11. A transmitter according to claim 9 wherein the transmitter transmits in a CDMA system.

12. A transmitter according to claim 9 wherein the modulator uses a QPSK modulation scheme.

* * * * *

UNITED STATES PATENT AND TRADEMARK OFFICE
CERTIFICATE OF CORRECTION

PATENT NO.    : 6,031,865
DATED         : February 29, 2000
INVENTOR(S)   : Kelton et al.

It is certified that error appears in the above-identified patent and that said Letters Patent is hereby corrected as shown below:

Drawings,
FIG. 8 is not considered to be prior art by the Applicants. FIG. 8 should not be labeled as –PRIOR ART–.

Signed and Sealed this

Twenty-fourth Day of December, 2002

JAMES E. ROGAN
*Director of the United States Patent and Trademark Office*